(12) United States Patent
Ilic et al.

(10) Patent No.: US 9,912,246 B2
(45) Date of Patent: Mar. 6, 2018

(54) BLEEDER CIRCUIT FOR A DIMMER OF A LIGHT NON-LINEAR LOAD

(71) Applicant: PHILIPS LIGHTING HOLDING B.V., Eindhoven (NL)

(72) Inventors: Miroslav Ilic, Liberty Grove (AU); Lorethus Omambac Bahan, Parramatta (AU); Ratko Milosavljevic, Gymea Bay (AU)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/901,128

(22) PCT Filed: Jun. 13, 2014

(86) PCT No.: PCT/EP2014/062296
§ 371 (c)(1),
(2) Date: Dec. 28, 2015

(87) PCT Pub. No.: WO2014/206758
PCT Pub. Date: Dec. 31, 2014

(65) Prior Publication Data
US 2016/0156275 A1   Jun. 2, 2016

(30) Foreign Application Priority Data
Jun. 27, 2013  (EP) ..................... 13174003

(51) Int. Cl.
*H02M 1/08*   (2006.01)
*H02M 5/293*  (2006.01)
(Continued)

(52) U.S. Cl.
CPC ............ *H02M 5/293* (2013.01); *H01F 7/064* (2013.01); *H02M 1/081* (2013.01); *H02P 27/04* (2013.01);
(Continued)

(58) Field of Classification Search
CPC .. H05B 41/28; H05B 41/295; H05B 41/2827; H02M 5/293; H02M 1/081; H01F 7/064
(Continued)

(56) References Cited

U.S. PATENT DOCUMENTS 5,747,972 A * 5/1998 Baretich ................. G05F 1/613
  323/223
6,856,101 B1 * 2/2005 Hitchcock .............. H05B 41/42
  315/186
(Continued)

FOREIGN PATENT DOCUMENTS

EP  2257124 A1  12/2010
TW  201146087 A  12/2011
(Continued)

OTHER PUBLICATIONS

AN-9745, "Design Guide for Triac Dimmable LED Driver Using FL7730" Fairchild Semiconductor Corp, Oct. 11, 2012. www.fairchildsemi.com.

*Primary Examiner* — Douglas W Owens
*Assistant Examiner* — Syed M Kaiser
(74) *Attorney, Agent, or Firm* — Akarsh P. Belagodu

(57) ABSTRACT

The invention describes a bleeder circuit (1) realized for use in a dimmer (2) comprising a main AC switch (20) for switching a supply voltage (LINE) to a light non-linear load (L), which bleeder circuit (1) comprises a bleeder load (11) realized to provide operational assistance to main AC switch (20); wherein the bleeder load (11) is enabled on the basis of a switching signal ($T_{20}$) of the main AC switch (20). The invention further describes a dimmer (2) comprising such a bleeder circuit (1). The invention also describes an electrical appliance comprising a light non-linear load (L) and such a dimmer (2). The invention further describes a method of dimming a light non-linear load (L).

12 Claims, 4 Drawing Sheets

(51) Int. Cl.
    *H05B 33/08*     (2006.01)
    *H05B 39/08*     (2006.01)
    *H01F 7/06*      (2006.01)
    *H02P 27/04*     (2016.01)

(52) U.S. Cl.
    CPC ..... *H05B 33/0806* (2013.01); *H05B 33/0818* (2013.01); *H05B 33/0845* (2013.01); *H05B 39/08* (2013.01); *H02M 2005/2932* (2013.01)

(58) Field of Classification Search
    USPC ........ 315/287, 294, 200 R, 85; 323/223, 384
    See application file for complete search history.

(56) References Cited

U.S. PATENT DOCUMENTS

| | | | | |
|---|---|---|---|---|
| 2001/0054887 | A1* | 12/2001 | Baretich | H02M 5/293 323/284 |
| 2003/0052658 | A1* | 3/2003 | Baretich | G05F 1/613 323/284 |
| 2003/0198048 | A1* | 10/2003 | Frederick | H05B 39/00 362/249.01 |
| 2007/0052397 | A1* | 3/2007 | Thompson | G05F 1/613 323/223 |
| 2011/0291583 | A1* | 12/2011 | Shen | H05B 33/0815 315/287 |
| 2012/0262084 | A1 | 10/2012 | Liu | |
| 2012/0319621 | A1 | 12/2012 | Sutardja et al. | |
| 2013/0033177 | A1* | 2/2013 | Rooijackers | H05B 41/28 315/85 |
| 2013/0169177 | A1* | 7/2013 | Liao | G05F 1/10 315/200 R |
| 2014/0049174 | A1* | 2/2014 | Radermacher | H05B 33/0821 315/200 R |
| 2014/0265888 | A1* | 9/2014 | Ekbote | H05B 33/0809 315/186 |
| 2014/0333228 | A1* | 11/2014 | Angeles | H05B 33/0815 315/291 |
| 2015/0048757 | A1* | 2/2015 | Boonen | H05B 33/0845 315/294 |

FOREIGN PATENT DOCUMENTS

| | | |
|---|---|---|
| WO | 2010137002 A1 | 12/2010 |
| WO | 2011045371 A1 | 4/2011 |
| WO | 2012031901 A1 | 3/2012 |

* cited by examiner

BLEEDER CIRCUIT FOR A DIMMER OF A LIGHT NON-LINEAR LOAD

CROSS-REFERENCE TO PRIOR APPLICATIONS

This application is the U.S. National Phase application under 35 U.S.C. § 371 of International Application No. PCT/EP2014/062296, filed on Jun. 13, 2014, which claims the benefit of European Patent Application No. 13174003.7, filed on Jun. 27, 2013. These applications are hereby incorporated by reference herein.

FIELD OF THE INVENTION

The invention describes a bleeder circuit for a dimmer of a light non-linear load. The invention also describes a dimmer, an electrical appliance, and a method of dimming a light non-linear load.

BACKGROUND OF THE INVENTION

The term 'dimming' may be generally understood as driving a load at a power that is lower than its rated power. In the case of a lamp, this reduction in power is immediately noticeable as a reduction in light output, hence the origin of the term 'dimming'. Other appliances can also be 'dimmed', for example an electric motor can be driven at a lower power by turning a 'dimmer' knob or switch. Such a knob or switch may be incorporated into the appliance or lamp, for example a desk-top lamp may have its own dimmer knob. A ceiling light fixture may be dimmed by a rotatable knob realized as part of the wall switch for that lighting fixture. The power of a hand-held appliance can be regulated by a knob incorporated in a housing of the appliance. Known dimmers that are used in appliances that run off a mains supply usually comprise an AC switch component such a phase-controlled triac, and are generally referred to as 'leading edge dimmers' or 'forward phase' dimmers. Such a dimmer effectively suppresses the early part of each sinusoidal half-wave of AC voltage to the load, by triggering the triac at a certain phase angle. The dimming level is generally controlled by a user input such as a rotatable knob whose action is converted into the trigger signal for the triac.

Instead of a triac, a component such as an alternistor, or silicon-controlled rectifier (SCR) can be used as the AC switch, with an appropriate control signal. A triac or alternistor is a semiconductor component that can conduct electric current in both directions when triggered. A silicon-controlled rectifier SCR is a similar device that conducts current in only one direction when triggered. For AC operation, two SCRs are arranged in an anti-parallel configuration. Triac/alternistor and anti-parallel connected SCRs are functionally identical and are referred to collectively in the following to as an 'AC switch'. For an AC switch to start conducting, the load current must exceed a 'latching current' before the end of the trigger pulse. Once latched, the AC switch will remain in the conductive state until the load current once again drops below a 'holding current' level. Latching current and holding current values are specific for each AC switch and are typically in the order of few tens of milliamperes.

Leading edge dimmers are traditionally used for dimming of incandescent lamps, which present an inherently resistive load to the dimmer. This type of load has unity power factor and generally draws enough current to ensure stable AC switch operation over the full dimming range. A resistive or linear load is associated with nearly perfect AC switch commutation, i.e. the transition between non-conductive and conductive states, which in turn ensures smooth operation over the whole dimming range. Even low-power incandescent lamps draw enough current when dimmed so that even if the load current should drop below the holding current level, any distortion is imperceptible. Similar is true in the case of an inductive load such as a magnetic transformer used to supply a low-voltage halogen lamp. In this case, the load current may drop to zero after the mains voltage zero-crossing point.

However, in the case of a light capacitive or non-linear load such as an electronic LED (light-emitting diode) driver or converter, the situation is more complex. Various undesirable issues may arise, for example missing cycles, a sudden change in output voltage or current, irregular AC switch turn-off at the end of a mains cycle, etc., and lead to unacceptable system performance. The type of problem will depend to a large extent on the nature of the load, the source impedance, the AC switch triggering method and various other circuit parameters.

A simple workaround for such an unacceptable performance is to add an extra load, commonly referred to as a 'bleeder', 'minimum load' or 'dummy load', to ensure correct AC switch commutation. A bleeder circuit assists dimmer operation by making up any difference between the load current and latching/holding currents, and by compensating the reactive nature of the load. Bleeders can be either linear or non-linear, and can comprise electronic circuitry with various levels of complexity. An advantage of linear bleeders is in their simplicity and low cost, but they produce a relatively significant amount of heat, typically 25-60 W, which can be a problem in some applications. Maintenance costs may also be significant, for example when an incandescent lamp with limited lifetime is used as the extra load. The prior art bleeders use the voltage or current at the dimmer output, so that the bleeder is realized on the load side of an arrangement comprising dimmer, load and bleeder. Usually, the prior art bleeder circuits are physically incorporated in the load, so that the dimmer itself is an entity that is electrically connected to but physically separate from the combined load and bleeder. This adds to complexity and cost in the design and manufacture of dimmable electrical appliances. Such dimmer circuit is for instance described in US2011/0291583. This dimmer circuit comprises a dimmer between AC mains and a rectifier. A DC signal is provided to a load. Between the rectifier and the load a bleeder and a phase detect circuit is provided. The phase detect circuit detects a phase angle of the rectified output signal generated by the dimmer. A programmable micro controller is coupled to the phase detect circuit and also receives the output signal generated by the dimmer. The micro controller generates a control signal to turn on/off the bleeder.

Design of a non-linear bleeder, also known as an 'active load', is based on the premise that extra load is needed only when the AC switch current drops below a holding current level. Compared to a linear bleeder, a functionally equivalent active load can reduce power dissipation by an order of magnitude. Active loads are generally also maintenance-free. However, active loads are significantly more complex and therefore more expensive than their linear counterparts. Another type of a non-linear bleeder is the 'switched resistor bleeder', which performs better than a linear bleeder and is less complex than an active load. A switched resistor bleeder effectively switches a power resistor across the dimmer output when the mains voltage drops below a certain threshold level. The extra load is added to the output of the dimmer only when it is needed, so that the overall power dissipation is less when compared to a linear bleeder. Even though a switched resistor is relatively simple in construction, it typically dissipates more power than a functionally equivalent active load.

Light-emitting diodes (LEDs) are becoming more widespread, and are being used more often to replace incandescent and halogen light sources. Many of the LED lamps available on the market today are retrofit for existing incandescent lamps. Because of its higher luminous efficiency, the power of an LED light source is only about one fifth of that of an equivalent incandescent lamp, so that an LED lamp can be regarded as a 'light load', whereby the term 'light' refers in this context to its low power consumption (in contrast to an incandescent lamp such as a 70 W light bulb which may be regarded as a 'heavy' load). However, when only a few such low-power LED lamps are controlled by a dimmer, the low power consumption typically results in latching issues at both ends of the mains half cycle. For example, an AC switch of the dimmer may 'overshoot', i.e. it may continue to conduct beyond the voltage zero-crossing point. Such an overshoot is undesirable since it may be perceived as annoying lamp flicker and can generate an undesirable DC current in the load and consequently also in the mains. Furthermore, an LED lamp generally always requires some kind of electronic driver. A part of every LED driver is a power converter, usually a switched-mode power converter, so that an LED lamp is effectively a non-linear load. Therefore, from the point of view of a dimmer, an LED lamp effectively presents a 'light non-linear load'.

Therefore, it is an object of the invention to provide an improved way of dimming a light non-linear load, avoiding the problems mentioned above.

SUMMARY OF THE INVENTION

According to the invention, the bleeder circuit is realized for use in a dimmer that comprises a main AC switch for switching a supply voltage to a light non-linear load, which bleeder circuit comprises a bleeder load realized to provide operational assistance to the main AC switch, and which bleeder circuit comprises bleeder load-enabling means. The bleeder load-enabling means are dependent of a switching signal of the main AC switch. The term 'bleeder load' is to be understood in its accepted and established context, i.e. a load that is used to provide extra current where needed. In the context of claim 1 of the invention, therefore, the bleeder load is used to provide extra current that assists the operation of the main AC switch, i.e. to ensure that the dimmer's main AC switch can commutate correctly. Since a bleeder load also serves to dissipate power, it may also be referred to as a 'power dissipative device'.

The switching signal of the main AC switch is to be understood as a signal that is only used internally in the dimmer, in contrast to a signal such as a dimmer output voltage or current that may be used by an external device. The switching signal of the main AC switch is therefore an 'internal' switching signal and is effectively unavailable to any external device such as a load connected across the output of the dimmer.

In the context of the present invention, the term 'light non-linear load' is to be understood as a load that dissipates only a small amount of power, and which appears non-linear from the point of view of the dimmer. For example, as mentioned in the introduction, the LED(s) of an LED-based lamp dissipate only a small amount of power, and its electronic driver causes the lamp to be 'seen' by a dimmer as a non-linear load. Other appliances may fall under the category of 'light and non-linear', for example a small electric motor of a hand-held appliance. Here and in the following, the terms 'light non-linear load' and 'load' may be used interchangeably. The term 'load' is to be understood as an electrical device that is dimmable in the sense described above, i.e. for operation at a lower than rated power level, and should not be confused with the term 'active load', which is another term that for 'bleeder circuit'. The term 'main AC switch' is to be understood as the dimmer's AC switch, i.e. the AC switch usually used in a dimmer such as a leading-edge dimmer. The terms 'main AC switch' and 'dimmer AC switch' may therefore be used interchangeably in the following. The 'main AC switch' can comprise any component such as a triac, alternistor, or anti-parallel connected SCRs etc., such as are used in a conventional leading-edge dimmer.

An advantage of the bleeder circuit (or just 'bleeder') according to the invention is that the bleeder load is enabled or activated on the basis of the internal switching signal of the main AC switch. In other words, only an internal signal of the dimmer is required to control the bleeder, and the bleeder can therefore be advantageously realized entirely on the dimmer side of an arrangement comprising dimmer, non-linear load and bleeder. This is in contrast to prior art active-load bleeders, which are dependent on the voltage or current at the dimmer output, and which therefore require that the bleeder is realized on the load side of the arrangement. As already mentioned, the prior art bleeder circuits are incorporated in the load (for example as part of an LED lighting arrangement that is connected to the output of a separate dimmer), so that the dimmer itself is an entity that is electrically connected to but physically separate from the combined load and bleeder. In contrast, the entire bleeder circuit according to the invention can be integrated into the dimmer, thus reducing the overall installation costs and complexity since there is no longer any need for external components between the dimmer and the light non-linear load. An advantage of using a signal such as the dimmer's main AC switch trigger signal instead of a dimmer output voltage signal is that the bleeder load of the bleeder circuit according to the invention can be perfectly synchronized with the dimmer's AC switch. This also greatly reduces the complexity of the bleeder circuit.

According to the invention, the dimmer comprises such a bleeder circuit, wherein the bleeder circuit is incorporated into the dimmer.

An advantage of the dimmer according to the invention is that the level of complexity of the bleeder circuit portion is relatively low, so that the combined dimmer/bleeder can be manufactured at relatively low cost and can be used in conjunction with any type of light non-linear load. The load itself therefore does not need to be designed to already incorporate a bleeder. Furthermore, the dimmer according to the invention can also be used in conjunction with a linear load (e.g. an incandescent lamp) without any detrimental effect on its operation.

According to the invention, the electrical appliance comprises a light non-linear load and a dimmer according to the invention, arranged across the light non-linear load, wherein the electrical appliance comprises any of a lighting arrangement, an electric motor, an electric valve, an electromagnet, etc.

An advantage of such an appliance, as indicated above, is that the load itself does not need to be designed to incorporate a bleeder, but can simply be connected to a single device that incorporates both dimmer and bleeder circuitry.

According to the invention, the method of dimming a light non-linear load comprises the steps of connecting a dimmer between a supply voltage and the light non-linear load, which dimmer comprises a main AC switch for switching the supply voltage to the light non-linear load; providing operational assistance to the main AC switch by a bleeder load of a bleeder circuit; and enabling the bleeder load on the basis of a switching signal of the main AC switch.

The dependent claims and the following description disclose particularly advantageous embodiments and features of the invention. Features of the embodiments may be combined as appropriate. Features described in the context of one claim category can apply equally to another claim category.

In the following, but without restricting the invention in any way, it may be assumed that the load is to be used from a mains power supply or household power supply. The terms 'power supply', 'mains' or 'household power' are all to be understood to mean a mains power supply such as a 230 V supply at 50 Hz, or a 120 V supply at 60 Hz, etc.

As mentioned in the introduction, a problem with using a leading-edge dimmer with a light load is that the voltage at the output of the dimmer may exhibit an undesirable zero-crossing overshoot. When the light non-linear load is a lamp such as an LED-based lamp, this overshoot can result in visible and irritating flicker.

In the following, but without restricting the invention in any way, it may be assumed for the purposes of illustration that the light non-linear load comprises an appliance or device such as an LED-based lamp with one or more LEDs. Of course, any other suitable low-power device may be used as a load across the output of a dimmer that incorporates the bleeder circuit according to the invention.

In the context of the present invention, the term 'main load current' is to be understood as the current drawn by the light non-linear load during operation. The term 'holding current' is to be understood as the minimum current required to ensure that the dimmer's main AC switch remains in a conductive state.

Usually, a leading edge dimmer operates by using a trigger signal such as a short pulse to trigger the dimmer's AC switch, allowing it to start conducting. The dimmer's AC switch will then effectively remain in the conductive state for the rest of that half-cycle. It is not until the end of the half-cycle that the dimmer's AC switch requires assistance in order to commutate properly and avoid overshoot. The bleeder load could be realized to work with such a trigger pulse. However, since the trigger pulse may appear at any time, at least in the first quarter of a mains cycle, the realization of the bleeder load may require complex circuitry to ensure that it only provides operational assistance, i.e. extra current, near the end of the half-cycle. Therefore, in a particularly preferred embodiment of the invention, the bleeder circuit comprises bleeder load-enabling means realized to enable the bleeder load, and wherein the bleeder load-enabling means are switched on the basis of the switching signal of the main AC switch. The bleeder load-enabling means can be any component or circuit that can be controlled to enable the bleeder load to provide its operational assistance when needed.

The bleeder load can be realized in any suitable manner using appropriate components. For example, one embodiment of a bleeder load could comprise a power dissipative device that is enabled using a circuit comprising a transistor such as a MOSFET within a diode bridge. However, such a switch topology may require complex drive circuitry and may add considerably to the overall cost of the bleeder circuit. Therefore, in a particularly preferred embodiment of the invention, the bleeder load-enabling means comprise an AC switch. To avoid confusion with the main or dimmer AC switch, the AC switch of the bleeder circuit is referred to as the 'auxiliary AC switch' in the context of the invention.

In a particularly preferred embodiment of the invention, the auxiliary AC switch and bleeder load are realized to provide operational assistance, i.e. additional current, when a load current of the light non-linear load drops below a holding current level of the main AC switch. In this way, the undesirable zero-crossing overshoot of the output voltage (i.e. the voltage to the light non-linear load) can essentially be eliminated. This ensures that the bleeder circuit essentially only makes up for the difference between the load current and holding current of the main AC switch in order to keep the main AC switch conducting until the end of a supply voltage half cycle.

As mentioned above, the auxiliary AC switch can be switched on the basis of a switching signal of the main AC switch. Preferably, the trigger signal to the auxiliary AC switch is derived from the trigger signal of the dimmer's main AC switch. In this way, the bleeder load can be advantageously synchronized to the main AC switch. The main AC switch trigger is usually generated by converting an input signal such as the position of a dimmer knob into a trigger pulse that is issued to coincide with an appropriate phase angle of a mains half-wave. Each mains voltage half-wave is effectively 'cropped' by the dimmer's switching signal, i.e. if the load is to be dimmed, each mains voltage half-wave is suppressed until the dimmer's switching signal appears. Since the dimmer's switching signal effectively triggers the main AC switch, it is referred to here as the 'main trigger signal'. If the load is to be dimmed only slightly, for example, the main trigger signal will appear close to the start of the mains half-wave. More dimming is obtained by timing the main trigger signal to appear later in the cycle, i.e. later in a half-wave of the AC mains supply. The highest diming level is achieved when the main trigger signal approaches the end of the mains half-wave. If the light non-linear load is a lamp, for example, the 'highest dimming level' results in the lowest light output level that can be achieved for that lamp.

The main trigger signal acts to 'enable' the desired remaining portion of the mains voltage half-wave, as described above. The relevant property of the main trigger, from the point of view of the auxiliary AC switch, is its leading edge, since this indicates the beginning of the conductive state of the main AC switch. However, the leading edge of the main trigger signal can appear essentially at any time during a mains half-cycle, but operational assistance is only required towards the end of the half-cycle. In one preferred embodiment of the invention, the bleeder circuit could comprise some means for converting a short trigger pulse (of the type generally used in prior art leading edge dimmers) into a signal that can be used to enable the bleeder load during the critical time towards the end of a mains half-cycle. Therefore, in a preferred embodiment of the invention, the bleeder circuit comprises a trigger circuit that is realized to convert the main trigger signal into a pulse to trigger the bleeder load-enabling means, for example an auxiliary AC switch. However, in a particularly preferred embodiment of the invention, the trigger circuit is realized to operate in conjunction with a main trigger signal whose leading edge indicates the beginning of the conductive state of the main AC switch, and whose trailing edge indicates the beginning of the critical time in which operational assistance is required. Such a more 'useful' main trigger signal can be generated relatively easily by the relevant control circuitry of the dimmer, and ensures that the bleeder circuit can use the relevant information provided by the main trigger signal to enable the bleeder load so that it can provide operational assistance exactly when required, and synchronously to the mains cycle. In a preferred embodiment of the invention, the trigger circuit comprises a differentiator circuit for deriving an bleeder load-enabling means trigger pulse from the main trigger's trailing edge. In other words, the differentiator converts the trailing edge of the main trigger into a pulse to trigger the bleeder load-enabling means, for example an auxiliary AC switch. In the following, for the sake of simplicity, it may be assumed that the bleeder load-enabling means comprises an AC switch, referred to simply as the 'auxiliary AC switch'.

The 'output' of the differentiator circuit will take some time to settle, depending on the size or capacity of the components used. To ensure that this part of the bleeder circuit always performs correctly, in a preferred embodiment of the invention the trigger circuit comprises a diode for reducing the time it takes for the differentiator to 'reset'. The diode acts to discharge a capacitor of the differentiator when the auxiliary AC switch trigger signal goes low, and to prepare or reset the differentiator in readiness for the next input, for example the main AC switch trigger signal. The diode effectively avoids a negative bias on an LED of the optotriac while discharging the capacitor.

Equally, the auxiliary AC switch trigger signal can be supplied from an external source such as an external control circuit that provides the trigger signal for the auxiliary AC switch, for example in the form of a pulse-width modulated signal. Here, the term 'external control circuit' is to be understood as not being incorporated directly into the dimmer. Such an external control circuit can deliver the auxiliary AC switch trigger signal as a direct control input to the auxiliary AC switch, so that the auxiliary AC switch is switched to enable the bleeder load. Such an auxiliary AC switch trigger signal may also be regarded as an internal switching signal of the dimmer, since it is only used internally by the dimmer and is not available to an external device such as a load connected across the outputs of the dimmer.

Generally, the main AC switch trigger signal will originate from a relatively low DC voltage rail supplied by a driver circuit of the dimmer, for example from a 12 V DC rail. Equally, if an external controller is used to supply an auxiliary AC switch trigger signal, this may be supplied from such a low voltage DC rail. On the other hand, the bleeder load is connected to the AC supply voltage side of the dimmer. Therefore, in a preferred embodiment of the invention, the auxiliary AC switch is realized to provide galvanic isolation between the trigger circuit and the bleeder load, thus keeping the 'DC side' separate from the 'AC side' and ensuring that current cannot flow between these circuit portions. To this end, in a particularly preferred embodiment of the invention, the AC switch comprises an optotriac. Such an optotriac is preferably chosen to have a high dV/dt rating in order to avoid spurious triggering around a voltage zero crossing point.

In normal operation, the voltage across the bleeder load is in the order of 10-15% of mains voltage. However, if the auxiliary AC switch misfires or fails, the bleeder load could temporarily or permanently be exposed to full mains voltage. If the bleeder load is based on the use of a linear resistor, the power dissipation in the bleeder load may be subject to a 100-fold increase, since it is proportional to the square of the voltage applied across the resistor. Such a large increase in power dissipation can cause permanent damage to the bleeder load and therefore also to the bleeder circuit. To prevent such damage, protective circuitry is required, which may however be complex and expensive. Therefore, in a preferred embodiment of the invention, the bleeder load comprises a limited power device. An example of a preferred embodiment of the bleeder circuit in that case might comprise a bleeder load with one or more positive temperature coefficient (PTC) thermistors. For example, the bleeder load can comprise several PTC thermistors in parallel. The use of a PTC thermistor instead of a linear resistor is preferred as it improves safety in the case of misfiring or failure of the auxiliary AC switch. A PTC thermistor is preferably chosen to provide self-limiting dissipation. When exposed to mains voltage, the PTC thermistor's resistance rapidly increases and reaches a balance at a well-defined and safe level as regards to power dissipation and temperature increase. Another advantage is that in the case of a transient disturbance, normal operation of the dimmer can continue as soon as the thermistor has cooled down. This embodiment of the bleeder may be regarded as a variant of a switched-resistor bleeder that is designed specifically to assist the main AC switch to turn off when a light non-linear load is connected to the output of the dimmer.

During operation of the load and dimmer, brief unexpected voltage surges may be passed from a load voltage input to the bleeder circuit. Such glitches or transients can damage sensitive circuit components. Therefore, in a preferred embodiment of the invention, the bleeder circuit comprises a transient suppressor arranged to protect the auxiliary AC switch, for example an optotriac, from voltage transients.

The bleeder circuit according to the invention is preferably realized for use between a mains power supply and a light load, which light load is realized to dissipate any quantity of power between 0 W and a rated load of the dimmer. For example, with a suitable choice of components for the bleeder circuit according to the invention, a dimmer can be realized that can be used to dim a low power load such as a lighting unit comprising one or more of the very efficient low-power LEDs that are being developed and manufactured at present. In a preferred embodiment, the bleeder circuit can be realized for use in a dimmer that can be operated off a household power supply.

In a preferred embodiment of the invention of the dimmer according to the invention, the dimmer comprises a means for generating a main trigger signal whose leading edge indicates the beginning of the conductive state for the main AC switch, and whose trailing edge is timed relative to the end mains half-cycle to indicate the region in which operational assistance is required by the bleeder circuit according to the invention. This allows a particularly straightforward design of the bleeder circuit, since the trailing edge of the main trigger signal can be relatively easily converted into a signal that can be used to enable the bleeder load during the critical time towards the end of the half-cycle.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
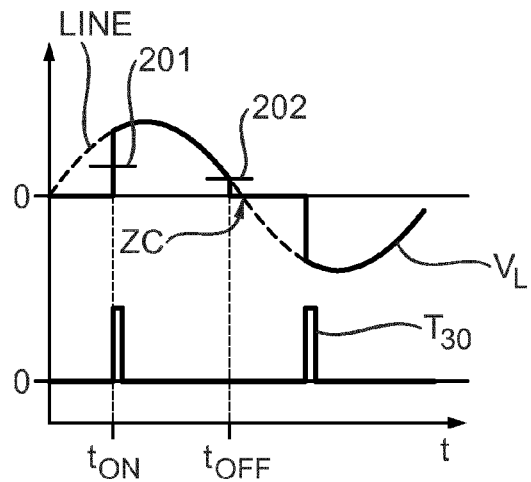
FIG. 1 shows voltage signals and a main trigger for a leading-edge dimmer.

FIG. 1 shows simplified voltage signals LINE, $V_L$ and a trigger $T_{30}$ for a prior art leading-edge dimmer using an AC switch such as a triac. For simplicity, the diagram shows signals that correspond to phase-controlled dimming of a resistive load. The diagram shows the relationship between the trigger timing and the output voltage $V_L$ that is passed to a load connected to the output of the dimmer. In phase control, a trigger pulse $T_{30}$ (shown here as an active-high pulse) can be applied at any point, or phase angle, of the AC supply voltage LINE to enable control of current supplied to the load. The output voltage $V_L$ of the dimmer is zero until the trigger pulse $T_{30}$ appears. The dimmer's AC switch starts conducting as soon as the trigger pulse $T_{30}$ is applied, so that a portion of the mains supply cycle can be applied across the load. In this type of dimmer, the leading edge of the trigger pulse $T_{30}$ is the event that marks the beginning of the conducting state of the dimmer's AC switch. The load current must exceed a latching current level 201 before the end of the trigger pulse $T_{30}$ to keep the dimmer's AC switch in a conducting state after the trigger pulse $T_{30}$ ends, thereby defining a minimum pulse duration for the trigger pulse $T_{30}$. Once latched, the dimmer's AC switch will stay in a conductive state until the load current drops below a holding current level 202 of the AC switch. Between these times, the remainder of the mains voltage half-cycle appears at the dimmer output (i.e. at the input to the load connected to the dimmer). Latching current and holding current values are specific for each AC switch. Ideally, the AC switch should not commutate before the point indicated by the arrow, i.e. the zero-crossing point ZC of the mains half cycle.

Figure 2:
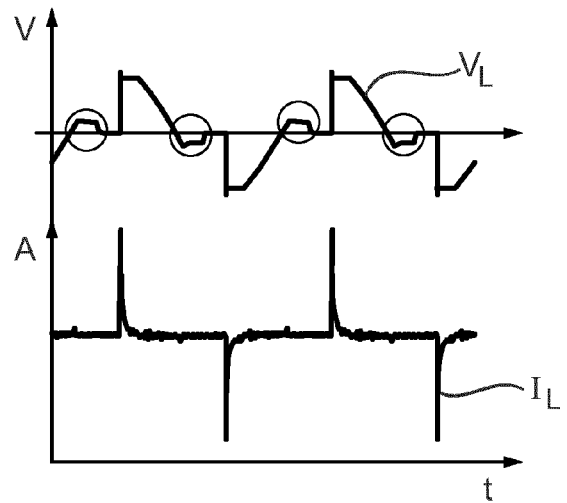
FIG. 2 shows output voltage and load current waveforms resulting from a prior art leading edge dimmer.

FIG. 2 shows output voltage and load current waveforms $V_L$, $I_L$ resulting from a prior art leading edge dimmer when used with a non-linear load such as an electronic driver/converter. Here, the problem of overshoot—commutation after the zero-crossing point of the mains half-cycle—is clearly shown in the circled regions of the output voltage waveform. The lamp current waveform has a distinctive peak which coincides with the AC switch triggering event. This peak is caused by charging the capacitors in the lamp driver and helps to latch the AC switch. After the capacitors are charged, the current drops to a much lower level and stays there until the AC switch turns off. However, owing to various factors such as inductor/capacitor filter characteristics, load capacitance and AC switch characteristics, the AC switch continues to conduct beyond the voltage zero-crossing point. This 'overshoot' is undesirable as it can lead to distortion of the dimming curve and visible flicker on the lamp.

Figure 3:
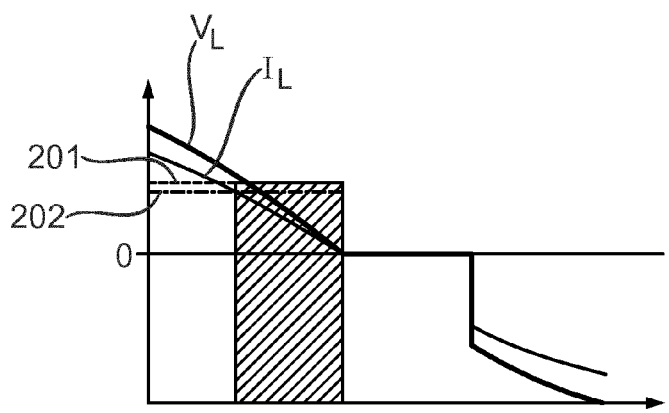
FIG. 3 illustrates the relationships between dimmer-relevant voltage and current levels.
Figure 4:
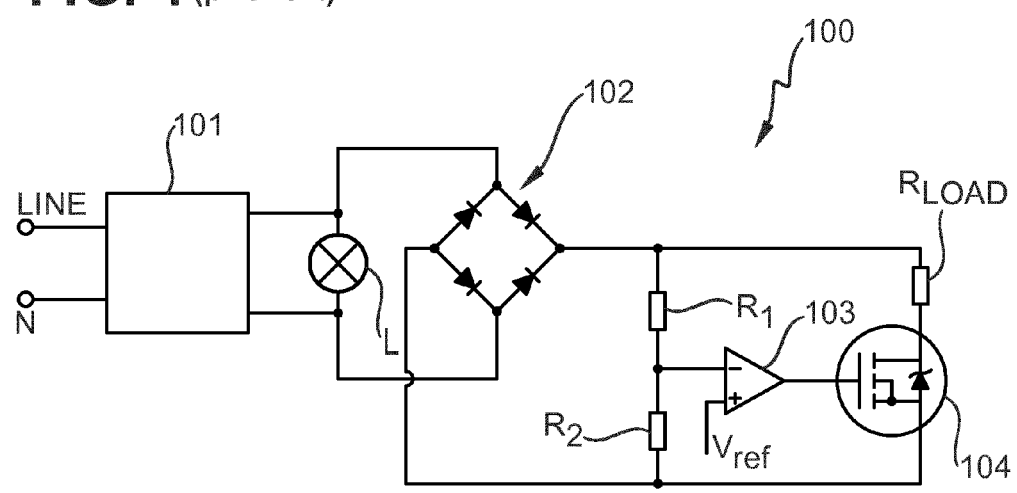
FIG. 4 shows a prior art dimmer and active load arrangement.

FIG. 3 shows voltage and current waveforms $V_L$, $I_L$ for an appliance presenting a resistive load such as an incandescent lamp, and the latching and holding current levels 201, 202 for a main AC switch of a conventional leading-edge dimmer. The diagram only shows a portion of a full cycle. The current $I_L$ drawn by the resistive load is easily large enough to hide the distortion caused by the difference between load current $I_L$ and holding current 202. However, if such a dimmer is used with a light, non-linear load, the difference between load current and holding current 202 will result in the distortion described in FIG. 2 above. Ideally, an active load should only make up for the difference between a main load current and the holding current 202 in order to keep the AC switch conducting until the end of a mains half cycle, for example during the shaded area shown in the diagram. A conventional bleeder is connected at the output of a conventional dimmer, and must rely on a dimmer output voltage as a control parameter in order to determine when to switch its bleeder load 'on' or 'off', as illustrated in FIG. 4, which shows a simplified circuit diagram of a prior art embodiment comprising a known switched-resistor bleeder. Here, a bleeder 100 and a dimmer 101 are realized effectively as separate entities. A load L is connected at the output of the dimmer 101. The main difference between this arrangement and the inventive dimmer is that the switched resistor bleeder 100 uses the dimmer output voltage as control parameter for enabling a load resistor $R_{LOAD}$. As long as the dimmer output voltage is below a threshold defined by a divider $R_{DIV1}$, $R_{DIV2}$ and the reference voltage $V_{REF}$, a comparator 103 switches a transistor 104 on, thereby enabling the load resistor $R_{LOAD}$. When the dimmer output voltage exceeds the threshold, the transistor 104 is switched off. Another difference is that this prior art arrangement requires a DC switch comprising a diode bridge 102 and the transistor 104 to control the current through the load resistor $R_{LOAD}$. This circuitry is more complex and expensive than the inventive circuit.

Figure 5:
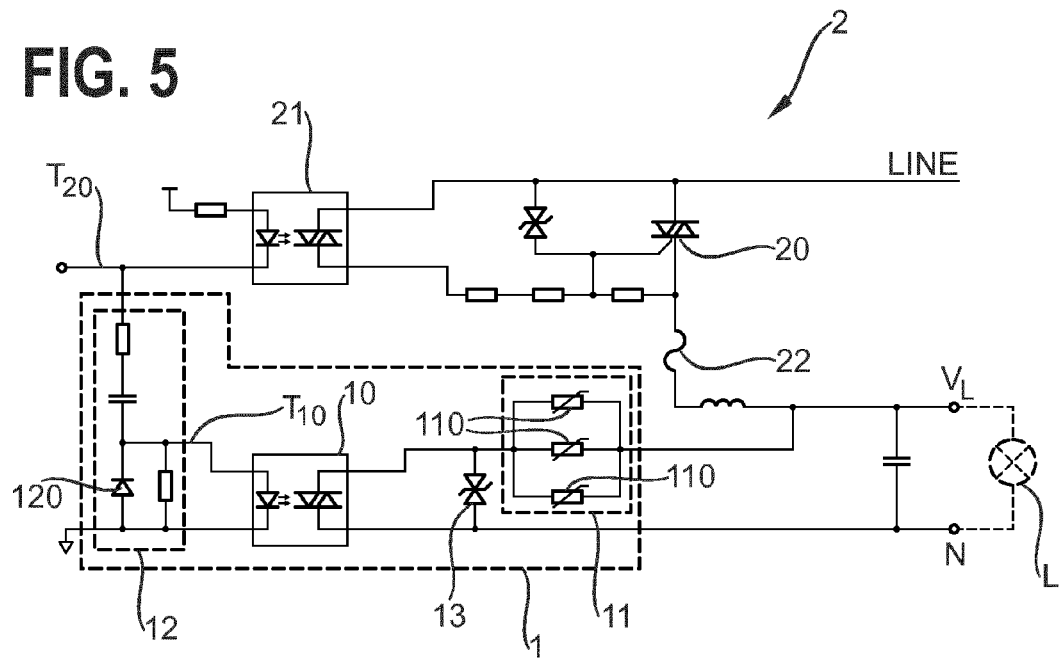
FIG. 5 shows a dimmer according to a first embodiment of the invention.

The bleeder circuit according to the invention provides an improved means of dimming, particularly when used with a light non-linear load, as will be explained in the following:

FIG. 5 shows a dimmer 2 according to a first embodiment of the invention. The dimmer 2 comprises circuitry that incorporates an embodiment of a bleeder 1 according to the invention. A load L can be connected across the dimmer output, so that the dimmer 2, together with the bleeder 1, is effectively arranged between the mains power supply LINE and the load L. The dimmer circuitry 2 comprises various elements 20, 21, 22 in an arrangement that will be known to the skilled person, using a main AC switch 20 such as a triac 20 to regulate the voltage supply $V_L$ to the load L; an optotriac 21 to provide galvanic isolation between a DC circuit portion delivering a main AC switch trigger signal and an AC circuit portion; a fuse 22 to protect the dimmer from a current surge, etc. The dimmer 2 comprises a driver (not shown here) that delivers the main AC switch trigger $T_{20}$ that determines the level of dimming. The bleeder 1 is arranged in this embodiment of the invention between the main trigger signal $T_{20}$ and the dimmer output. The bleeder 1 comprises a trigger circuit 12, an auxiliary AC switch 10, and a bleeder load 11, in this case a limited power bleeder load 11. The main trigger $T_{20}$ is an active-low signal whose trailing edge is converted by the trigger circuit 12—in this case a differentiator 12—into a trigger pulse $T_{10}$ that triggers the AC switch 10. Here, the AC switch 10 is an optotriac 10. The bleeder load 11 is a PTC switched-resistor component comprising several thermistors in parallel. To avoid damage owing to spikes when the main AC switch 20 is turning on, a transient voltage suppressor 13 is arranged in parallel with the optotriac 10.

The 'output' of the differentiator circuit 12 will take some time to decay, depending on the size or capacity of the components used. To ensure that this part of the bleeder circuit 1 always performs correctly, the trigger circuit 12 comprises a diode 120 for reducing the time it takes for the differentiator circuit 12 to 'reset'. The diode 120 acts to discharge a capacitor of the differentiator 12 when the main trigger signal $T_{10}$ goes low and to prepare or reset the differentiator 12 in readiness for the next main trigger signal $T_{20}$, from which the auxiliary trigger signal $T_{10}$ is derived. The diode 120 effectively avoids a negative bias on an LED of the optotriac 10 while discharging the capacitor. The diode 120 can effectively reduce the reset time by half. While a longer reset time may be acceptable, a shorter reset time provides more margin in the case of an excessively high mains supply frequency, e.g. when power is supplied by a small electric generator.

Figure 6:
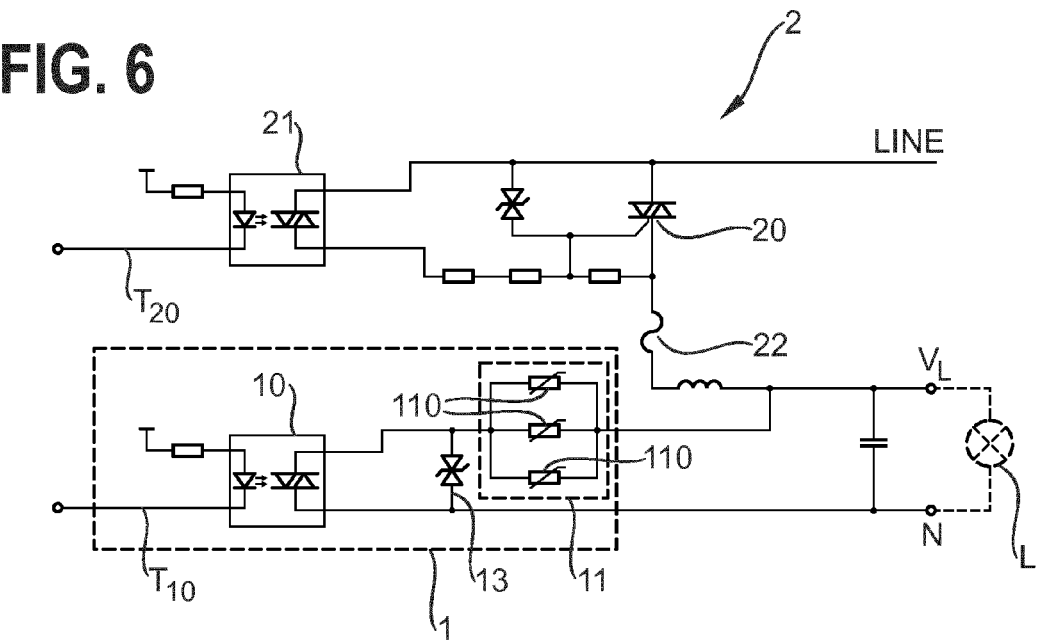
FIG. 6 shows a dimmer according to a second embodiment of the invention.

FIG. 6 shows a dimmer 2 according to a second embodiment of the invention. Here, the circuitry is largely the same as in FIG. 4, but the trigger pulse $T_{10}$ to the optotriac 10 is provided by control circuitry (not shown here), external to the bleeder circuit and internal to the dimmer. For example, the same circuitry of the dimmer that is used to generate the main trigger $T_{20}$ can also be used to generate the trigger pulse $T_{10}$. One realization could foresee the inclusion of a trigger circuit (such as that described in FIG. 5) into a dimmer circuitry portion, so that after it has generated the main trigger $T_{20}$, this can be used to generate the auxiliary AC switch trigger pulse $T_{10}$.

Figure 7:
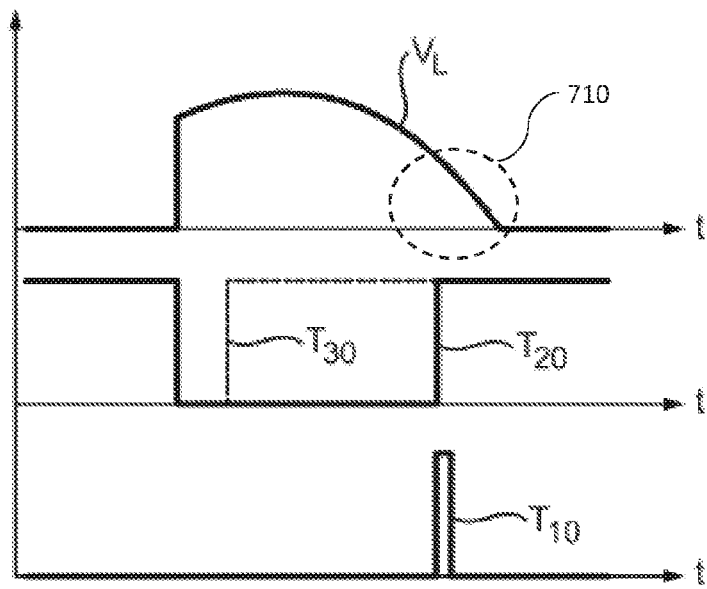
FIG. 7 shows various trigger pulses generated by embodiments of a bleeder circuit according to the invention.

FIG. 7 shows various signals arising in embodiments of a bleeder circuit 1 and dimmer 2 according to the invention. A 'cropped' mains half-cycle $V_L$ is shown, along with a main trigger signal $T_{20}$ (in this case, an active-low signal) whose leading edge is responsible for switching the main AC switch 20 of the dimmer 2. The trailing edge of the main trigger signal $T_{20}$ is converted into the auxiliary AC switch trigger $T_{10}$ used to trigger the auxiliary AC switch 10 in order to enable the bleeder load 11. An active-low version of a shorter main trigger signal $T_{30}$ as used in the prior art leading edge dimmer and described in FIG. 1 is shown for comparison (dotted line). The auxiliary AC switch trigger $T_{10}$ can have been generated by the differentiator 12 of FIG. 5. Otherwise, an auxiliary AC switch trigger $T_{10}$ can have been provided by an external controller, as described in FIG. 6, that can ensure that the auxiliary AC switch trigger $T_{10}$ is provided at the critical portion 710 towards the end of the half-cycle, when the load current may fail to meet the holding current level of the main AC switch 20.

The trigger signal T10 generated by the differentiator 12 triggers the auxiliary AC switch 10, which is realized using an optotriac 10. The resulting brief current spike through the optotriac 10 essentially coincides with the auxiliary AC switch trigger T10, and results in a current through the PTC resistors of the bleeder load 11. This additional current provides operational assistance to the dimmer's main AC switch 20, so that overshoot is prevented when the dimmer is used with a light non-linear load.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bleeder circuit for use in a dimmer comprising a main AC switch for switching a supply voltage (LINE) to a light emitting non-linear load, the bleeder circuit comprising:
   a bleeder load configured to provide operational assistance to the main AC switch, and
   a bleeder load-enabling circuit-adapted to turn on said bleeder load at a waveform portion proximate an end of a half-cycle of the supply voltage (LINE) based on a switching signal of the main AC switch.

2. The bleeder circuit according to claim 1, wherein the bleeder load-enabling circuit is switchable on the basis of the switching signal of the main AC switch, and said switching signal is an internal trigger signal of the dimmer adapted to trigger the main AC switch and make the main AC switch start conducting.

3. The bleeder circuit according to claim 2, wherein the bleeder load-enabling circuit comprises an auxiliary AC switch, and the main AC switch is a triac.

4. The bleeder circuit according to claim 1, realized to provide operational assistance to the main AC switch when a load current of the light emitting non-linear load drops below a holding current level of the main AC switch at the waveform portion proximate the end of the half-cycle of the supply voltage (LINE).

5. The bleeder circuit according to claim 2, comprising a trigger circuit realized to derive a bleeder load-enabling circuit trigger signal from the internal trigger signal.

6. The bleeder circuit according to claim 5, wherein the trigger circuit comprises a differentiator circuit for generating the bleeder load-enabling circuit trigger signal.

7. The bleeder circuit according to claim 2, wherein the bleeder load-enabling circuit trigger signal is derived from a trailing edge of the internal trigger signal.

8. The bleeder circuit according to claim 2, wherein the bleeder load-enabling circuit comprises an optotriac.

9. The bleeder circuit according to claim 1, wherein the bleeder load comprises a number of positive temperature coefficient thermistors.

10. The bleeder circuit according to claim 1, comprising a transient suppressor for protecting the auxiliary AC switch from voltage transients.

11. The bleeder circuit according to claim 1, realized for use between a mains power supply and the light emitting non-linear, the light emitting non-linear load being realized to dissipate any quantity of power between 0 W and a rated load of the dimmer.

12. A method of dimming a light emitting non-linear load, the method comprises the steps of
   connecting a dimmer between a supply voltage (LINE) and the light emitting non-linear load, the dimmer comprising a main AC switch for switching the supply voltage (LINE) to the light emitting non-linear load;
   enabling a bleeder load on the basis of a switching signal of the main AC switch by turning on said bleeder load at a waveform portion proximate an end of a half-cycle of the supply voltage (LINE), so as to provide operational assistance to the main AC switch.

* * * * *